United States Patent
Butler et al.

(10) Patent No.: US 10,064,001 B1
(45) Date of Patent: Aug. 28, 2018

(54) PASSIVE DEVICE MONITORING USING RADIO FREQUENCY SIGNALS

(71) Applicant: Amazon Technologies, Inc., Seattle, WA (US)

(72) Inventors: David George Butler, San Jose, CA (US); Richard William Mincher, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/618,950

(22) Filed: Jun. 9, 2017

Related U.S. Application Data

(63) Continuation of application No. 14/971,229, filed on Dec. 16, 2015, now Pat. No. 9,681,263, which is a continuation of application No. 14/136,488, filed on Dec. 20, 2013, now Pat. No. 9,245,433.

(51) Int. Cl.
| | |
|---|---|
| G08B 13/00 | (2006.01) |
| H04W 4/02 | (2018.01) |
| H04L 29/12 | (2006.01) |
| H04W 24/08 | (2009.01) |

(52) U.S. Cl.
CPC .......... *H04W 4/02* (2013.01); *H04L 61/1547* (2013.01); *H04W 24/08* (2013.01)

(58) Field of Classification Search
CPC .... G08B 13/2491; H04W 4/02; H04W 4/021; H04W 4/025; H04W 24/08; H04L 67/18; H04L 67/22; H04L 67/24; H04L 61/1547

USPC .................. 340/541, 539.13, 573.4, 5.3, 5.8; 455/456.1, 456.6
See application file for complete search history.

(56) References Cited

U.S. PATENT DOCUMENTS

| | | | | |
|---|---|---|---|---|
| 5,268,670 | A * | 12/1993 | Brasch ................ | G07C 9/00111 340/541 |
| 6,300,872 | B1 * | 10/2001 | Mathias .............. | G07C 9/00111 340/572.4 |
| 2001/0011954 | A1 * | 8/2001 | Shelton ..................... | G01S 5/06 340/12.23 |
| 2002/0070863 | A1 * | 6/2002 | Brooking ............ | G07C 9/00111 340/572.1 |
| 2004/0203408 | A1 * | 10/2004 | Wen ........................ | H04W 4/02 455/66.1 |
| 2008/0220724 | A1 * | 9/2008 | Roh ...................... | H04W 8/005 455/66.1 |
| 2008/0272905 | A1 * | 11/2008 | Higaki ............... | G07C 9/00166 340/539.11 |
| 2008/0318591 | A1 * | 12/2008 | Oliver ................... | H04W 4/021 455/456.1 |
| 2012/0163206 | A1 * | 6/2012 | Leung ..................... | H04W 4/02 370/252 |

\* cited by examiner

*Primary Examiner* — Thomas Mullen
(74) *Attorney, Agent, or Firm* — Pierce Atwood LLP

(57) ABSTRACT

A rule-based machine learning system monitors frequency bands to detect transmissions from nearby active transmitters, such as those associated with wireless mobile devices. The system logs unique identifiers (UID) embedded in detected transmissions, recognizes patterns of UID detection over time, and selectively takes action when UIDs are detected and when they are expected but absent.

20 Claims, 10 Drawing Sheets

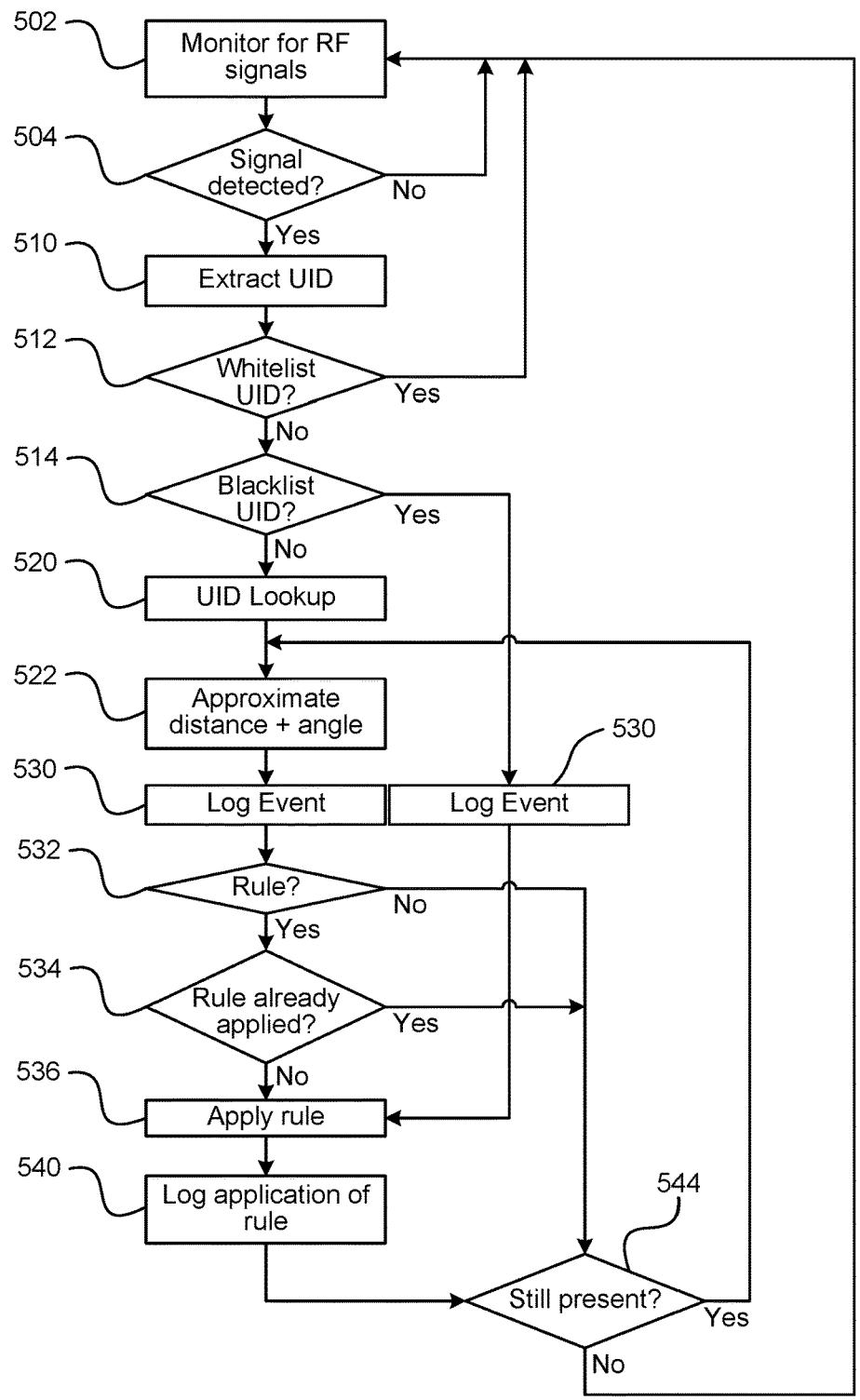

PASSIVE DEVICE MONITORING USING RADIO FREQUENCY SIGNALS

CROSS-REFERENCES TO RELATED APPLICATIONS

This application is a continuation of, and claims the benefit of priority to, U.S. Non-provisional patent application Ser. No. 14/971,229, filed Dec. 16, 2015, entitled "Passive Device Monitoring Using Radio Frequency Signals," in the names of David George Butler, et al., and issued as U.S. Pat. No. 9,681,263, which is a continuation of, and claims the benefit of priority to U.S. Non-provisional patent application Ser. No. 14/136,488, filed Dec. 20, 2013, entitled "Passive Device Monitoring Using Radio Frequency Signals," in the names of David George Butler, et al., and issued as U.S. Pat. No. 9,245,433. This application also claims the benefit of priority to U.S. Non-provisional patent application Ser. No. 14/136,488. The contents of both of the above are expressly incorporated herein by reference in their entireties.

BACKGROUND

Personal wireless electronic devices have become ubiquitous. Many of these devices use more than one wireless protocol to connect to the outside world, such as the cellular, WiFi, and Bluetooth communications commonly found on today's smartphones. These devices are continuously on and are detectable by the signals they emit.

BRIEF DESCRIPTION OF DRAWINGS

For a more complete understanding of the present disclosure, reference is now made to the following description taken in conjunction with the accompanying drawings.

FIGS. 5A and 5B are examples of algorithms that apply rules based upon the presence and identification of RF signals.

DETAILED DESCRIPTION

Figure 1:
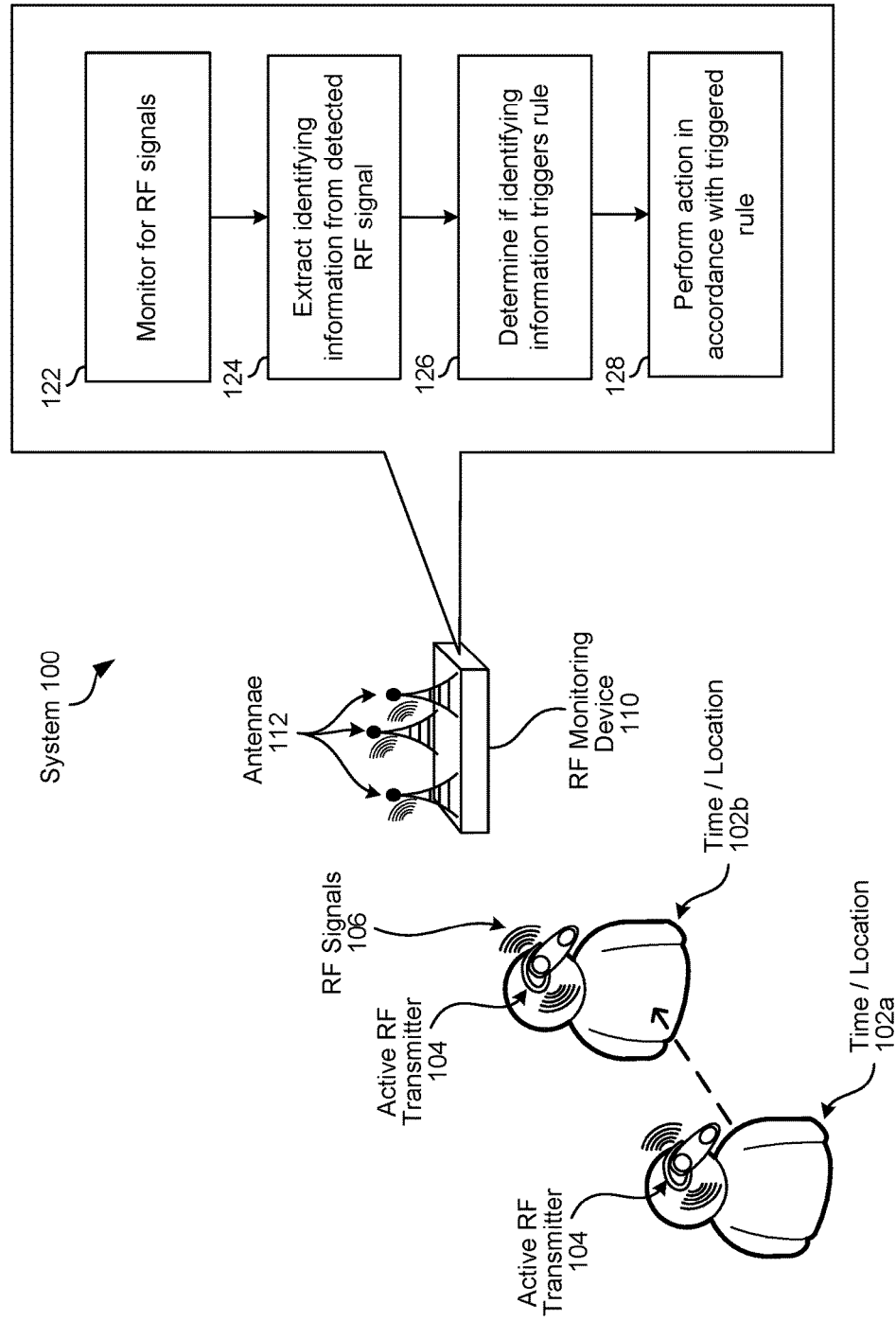
FIG. 1 illustrates a radio-frequency (RF) based system for intrusion or attendance monitoring, time-stamping, and notification.

A rule-based machine learning system monitors frequency bands to detect transmissions from nearby active transmitters, such as those associated with wireless mobile devices. The system logs unique identifiers (UID) embedded in detected transmissions, recognizes patterns of UID detection over time, and selectively takes action when UIDs are detected and when they are expected but absent.

The concept of passive monitoring of people and vehicles is increasingly used for security and other purposes. For example, governments and law enforcement use specialized technologies to scan for license plates, faces in crowds, particular voices in communications, etc. Such systems can be very expensive and proprietary, and are not widely available to the general public for home and business security.

Many people (including criminals and real estate agents) carry portable electronic devices such as cell phones, tablets, etc. that have cellular, WiFi, Bluetooth, or other wireless connectivity capabilities. By placing a device that scans for these signals in one's home or business, it is possible to passively and/or actively scan, listen to, and record all activated wireless devices that are proximate to the monitoring device's location. The monitoring device logs information acquired from a nearby wireless device such as the device's name, media access control (MAC) address (e.g., as used by WiFi devices), electronic serial number (ESN) or user identity module identifier (UIMID) (e.g., as used by third-generation code-division multiple access (CDMA) cellular telephones), International Mobile Equipment Identifier (IMEI) (e.g., as used by third-generation Global System for Mobile Communications (GSM) and fourth generation Long Term Evolution (LTE) cellular telephones), a mobile equipment identifier (MEID) (replacing ESNs in newer CDMA cellular telephones), international mobile subscriber identify (IMSI) (used to identify a user of a cellular network), a Mobile Subscriber Integrated Services Digital Network Number (MSISDN) (used to identify a subscription in a GSM or Universal Mobile Telecommunications System (UMTS) cellular network), and/or other identifying information. Some of these UIDs are hardcoded into a chip on the transmitting device and are always used for communications as a condition of the wireless protocol(s) associated with the monitored signals.

Logging may also include the approximate distance between the monitoring device and the portable device, the approximate or actual location of the portable device, the time spent within range of the monitoring device, the time spent at each location, the detected wireless communications protocol or protocols, and other information associated with the portable device. All of the data may be visible for the radio frequency (RF) monitoring device's owners, and the data may trigger rules that generate notifications based on certain criteria. Examples of messages and notifications include a text message, e-mail message, voicemail message, and telephone calls to the owner. Other rules-based actions may also be taken, such as activating lighting or activating an alarm.

As someone walks by or drives by the monitoring device's location, some or all of this identifying information may be recorded with a timestamp (e.g., time and date). This would include someone who is burglarizing the home or business, the presence of a delivery person, or the presence of a real estate agent who is showing a home for sale.

This information, in the case of a burglary, may be used to help correlate that the burglar (or more specifically, the burglar's electronic device) had been at the monitoring device's location at specific times in the past. If multiple neighbors form a network of monitoring devices, as will be discussed with FIG. 3, the system can supplement a neighborhood watch, for example by tracking the movements of a radio frequency (RF) device associated with one or more burglaries in the past, and generating notifications if the RF device is again detected. While the information acquired from the burglar's RF device might not be recorded to specifically identify the burglar, this electronic "fingerprint" can be compared to a suspect's and help to corroborate that the suspect was present in the neighborhood at the time of the burglaries. Neighbors, guests, and residents can be filtered out and/or ignored.

Real estate agents can use this information to track home showings or people walking or driving by the house. Someone standing outside the house can be differentiated from someone merely walking by based on the length of time someone spends in range of the device, whether they approach the house, etc.

Package and delivery tracking can also be correlated by detecting the wireless device(s) that carriers or drivers possess while leaving packages at a front door. A thief who later comes up to steal that same package might also be detected. Similarly, if a user receives a notification from the carrier that a package was dropped off, but no UID of the delivery person was detected at their home, while at same time the package was supposedly delivered, the delivery person's UID was detected at the house next door, examination of the detected UID logs might lead the user to check at their neighbor's house for their package.

Correlations between different UIDs may also be identified. For example, if a car has Bluetooth, it may be detected together with the UID of a person's cellphone when they arrive home and when they depart. However, when the car is turned off, the car's Bluetooth is likely turned off as well.

Other examples include letting parents know when their children arrive home (or when they are overdue), taking attendance at schools and testing centers based on students' RF signature, detecting too many or an unknown unique identifier (UID) during testing, detecting deviations in the rounds of security guards, when someone's appearance or absence is out-of-the-ordinary, when an unknown UID is loitering at irregular times (e.g., someone unknown present nearby for an extended period in the middle of the night), and setting up an RF proximity-based "fence" providing a warning of visitors. By coupling the tracking of an RF-signature and/or "registration" of a device with time-stamping and location tracking, and applying rules and pattern recognition to sift the resulting data, the monitoring device may provide a wide variety of notification and "early warning" services, such as turning on lights (such as one or more designated security lights of a home), ringing a bell, placing a telephone call, sending a text message or e-mail, or some combination thereof.

FIG. 1 illustrates a system 100 for intrusion or attendance monitoring, time-stamping, and notification. An RF monitoring device 110 monitors (122) for RF signals 106 using one or more antennae 112. If an RF signal is detected, the device 110 extracts (124) identifying information from the detected signal 106, and determines (126) whether the identifying information triggers (126) a rule. If a rule is triggered, the device 110 performs an action (128) in accordance with the triggered rule.

Monitoring for RF signals (122) may be passive (e.g., listening only with no established connection between the RF monitoring device and a detected RF transmitter 104), or active. If monitoring is passive, the device 110 may, among other things, extract the detected device's name, MAC address, ESN, UIMID, IMEI, MEID, IMSI, MSISDN, or other unique identifiers (UIDs). Passive monitoring may include sequential scanning through a series of bands, or may include simultaneously surveilling multiple bands, depending upon hardware limitations. During "passive" monitoring, the detected RF transmitter 104 does not "attach" to the monitoring device 110 (e.g., the monitoring device 110 does not accept a connection request from the detected device). A passive monitoring device may be configured so that it does not form any connection with a detected RF transmitter 104 or otherwise broadcast, making the monitoring device 110 invisible and virtually undetectable by the device with the active RF transmitter 104. However, if not configured to be invisible, the monitoring device 110 may perform basic protocol "handshaking" communications with a detected RF transmitter 104 in accordance with communications standards for the particular radio access technology, and still be regarded as passive, so long as the monitoring device does not accept a connection request and allow the detected RF transmitter 104 to attach.

Another example of extracted information is if the detected device is searching for hidden service set identifiers (SSIDs). SSIDs broadcast the name of the broadcasting router so that wireless devices can find and connect to the router. Some routers are configured not to broadcast an SSID in an effort not to be detected, thereby increasing security. However, wireless devices that subscribe to the hidden router may periodically broadcast an "are you there?" message when not connected in an effort to locate the router. This query message may be logged as a way of further identifying a particular device.

If monitoring is active, then in addition to passively extracting information, the device 110 may allow the detected RF transmitter 104 to attach and/or send a query for information after forming a communications connection to the detected device, if supported by the relevant communications protocol. (In comparison, the protocol "handshake" that may occur in passive operation does not ask the detected RF transmitter 104 to do anything, but rather is a low-level exchange that may occur in some technologies). To actively extract information, the RF monitoring device 110 may also serve as a honeypot. Many devices will auto-connect to open networks. Configured as a honeypot, the device 110 sends out signals indicating that it is an open data or telecommunications network, accepting auto-connects, while actually isolating the connecting device and monitoring and logging any transactions the connecting device attempts to undertake (e.g., letting the device auto-connect to what appears to be the internet, and then collecting information when the device attempts to auto-update by connecting to an e-mail server, social media, etc.). An active honeypot may be particularly advantageous in a test-taking environment, intercepting outgoing connections and logging information that might indicate attempts to cheat.

The device may also compare the extracted information against data stored in one or more databases in order to determine additional identifying information, such as a database further identifying or characterizing specific UIDs or ranges of UIDs.

For example, when the RF monitoring device 110 detects an active RF transmitter 104, the detected signal's (106) UID may trigger a rule, such as when an owner of the device 110 has created a rule to send a notification (e.g., an action 128) whenever an RF transmitter 104 associated with a specific person in the database is detected. Likewise, if the RF monitoring device 110 determines an approximate distance of the transmitter 104 (e.g., based on signal strength received at an antenna 112, based on the differential signal strength across multiple antennae 112, or based on other such techniques), a rule may specify to act if a specific UID or an unknown UID is detected within a threshold distance, such as when RF transmitter 104 moves from location 102a to location 102b.

Rules may be based on a wide variety of criteria, including time-based and location-based patterns associated with a UID, and associations between different UIDs (e.g., if a pattern of UID detections, as will be further discussed with pattern recognition engine 436, indicates that a first UID is usually contemporaneously detected in proximity to a second UID, then detection of the first UID without the second UID may trigger a rule-based action). Rules may also require a certain number of occurrences before an action is triggered (e.g., the first "N" times an unknown UID is detected, do nothing), or may specify an escalating level of action depending upon how many occurrences have occurred. Rules may include specific times and days as criteria (e.g., execute only outside of defined business hours). Rules may be prioritized by a device administrator/owner, and some rules may indicate to execute no further rules if the criteria of the specifying rule is satisfied. High priority rules may include, among other things, defined exceptions policies defining when detection events should be ignored.

Figure 2:
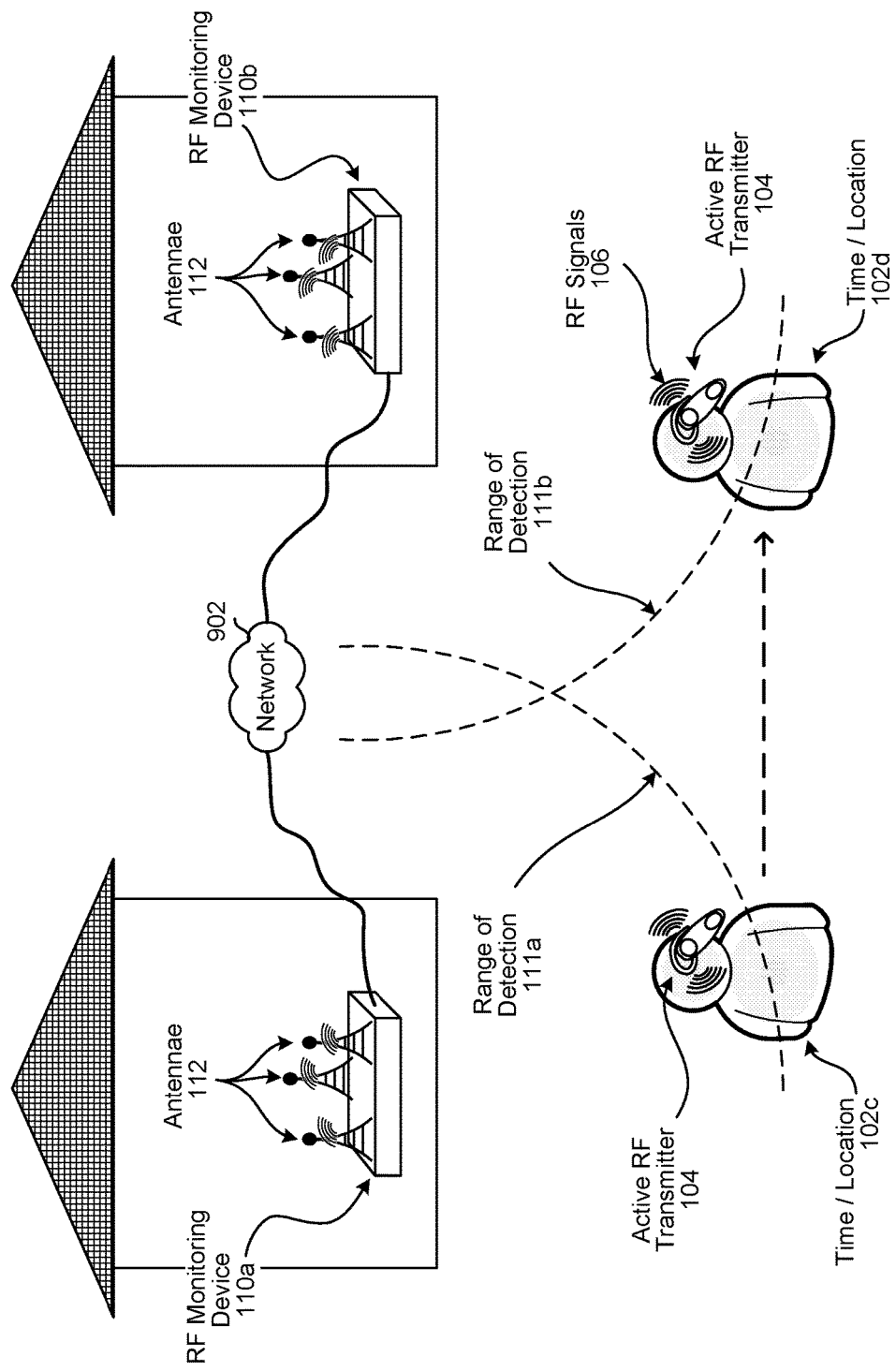
FIGS. 2 and 3 illustrate the RF-based systems linked over a network.

FIG. 2 illustrates an RF monitoring device 110a linked to an RF monitoring device 110b via a network 902. The connections to the network 902 may be wired or wireless. The RF monitoring devices (110a, 110b) may share information regarding detection of the active RF transmitter 104, the associated UID(s), and the transmitter's movement over time, such as movement from a first location 102c within a range of detection 111a of a first RF monitoring device 110a to a second location 102d within a range of detection 111b of a second RF monitoring device 110b.

Figure 3:
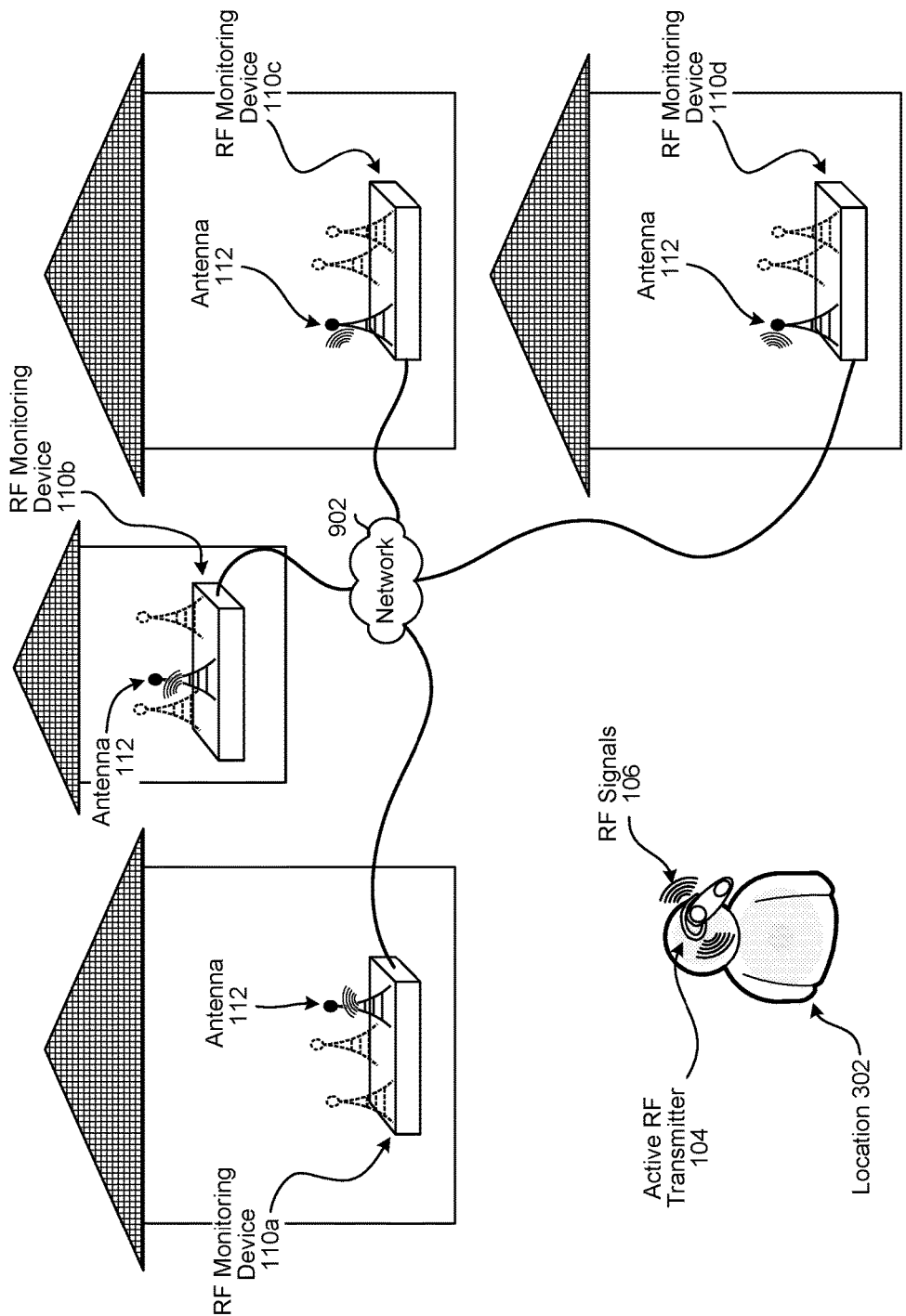

As shown in FIG. 3, by networking the RF monitoring devices (110a to 110d), a location 302 of the active RF transmitter 104 may be determined by techniques such as triangulation, trilateration, and/or multilateration even if each RF monitoring device 110 measures signal strength and/or time-of-receipt without an independent determination of the originating location 302 of the active RF transmitter 104. Even if individual RF monitoring devices are able to independently identify the location 302, sharing data may improve the accuracy of this determination. The RF monitoring devices (110a to 110d) may connect to each other directly (e.g., via WiFi) or via a network 902 such as the Internet.

As an example of a topology, the networked RF monitoring devices (110a to 110d) may be configured to operate as a mesh network, with each device serving as a "node" of the mesh. In a mesh network, each node not only captures and disseminates its own data, but also may serve as a relay for data from other nodes of the mesh. In other words, even if a node is only able to connect to one other node, it can join the mesh and exchange data with more distant nodes. While such a topology may be used with either device-to-device or network-connected devices, the relaying provided by a mesh has the added advantage in a device-to-device connected network by allowing geographic outliers to participate (e.g., an RF monitoring device that can only establish a WiFi connection with one other RF monitoring device may nevertheless be an integral node of the mesh).

Other physical or virtual topologies may be used. For example, individual RF monitoring devices may share information directly with all the other members (i.e., a "fully connected" network) without relaying. As another example, one or more devices (e.g., a server 918 or "master" RF monitoring device utilizing a "star" topology) may be used to collect information from the RF monitoring devices and then disseminate the collected information. As another example, a virtual ring topology may be employed where a first device relays its information to a second device, the second device adds information it has about the UID and transmits the cumulative information to a third device, which adds the information it has about the UID, etc., until the growing body of information "circles" around the loop back to the first device.

Figure 4:
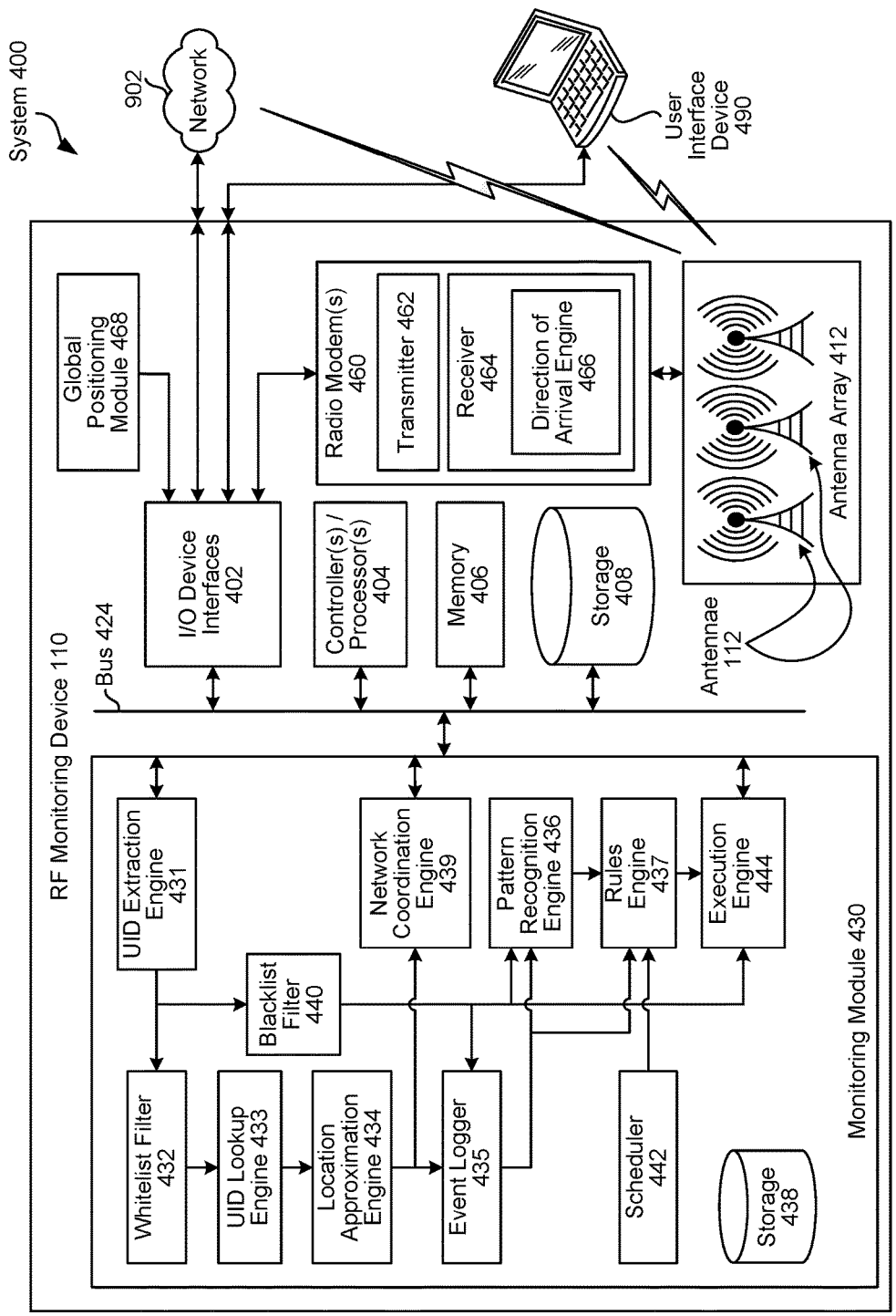
FIG. 4 is a block diagram conceptually illustrating example components of an RF-based system for intrusion or attendance monitoring, time-stamping, and notification.

FIG. 4 is a block diagram conceptually illustrating example components of a system 400 including the RF monitoring device 110. In operation, the system 400 and RF monitoring device 110 may include computer-readable and computer-executable instructions that reside on the RF monitoring device 110 and/or a user interface device 490, as will be discussed further below.

The RF monitoring device 110 may be a specialized piece of hardware, but may also be a software or firmware implementation on hardware serving other purposes, such as a wireless computing device (e.g., a computer or a smartphone), a wireless local-area network (WLAN) router (e.g., a WiFi router), a wide-area network (WAN) router (e.g., a worldwide interoperability for microwave access (WiMAX) router), a cellular telephone repeater (e.g., a device that links a mobile device to a cellular network tower, boosting the signal beyond that allowed by mobile devices), a cellular telephone to Internet bridge (e.g., a device that provides mobile devices with telephony services, but links to the telephone network via the Internet rather than via a connection to a network tower), or some combination thereof. For example, the RF monitoring device 110 may be an off-the-shelf router loaded with custom firmware.

As illustrated in FIG. 4, the RF monitoring device 110 may include or be connected to one or more antennae 112. The antennae 112 may be, for example, directional antennae. If there are plural antennae 112, they may be arranged as an antenna array 412. The antennae 112 are connected to one or more radio modem(s) 460 including an RF transmitter 462 and a receiver 464. The radio modem(s) 462 may be configured to support specific communications protocols and/or may utilize software-defined radio, whereby the modem may be adaptively programmed to support different protocols.

The receiver 464 may include a direction of arrival (DOA) engine 466 to estimate an originating direction of a signal received by two or more antennae of the antenna array 412. Various techniques for calculating the direction of arrival may be used, such as Angle of Arrival (AoA), Time Difference of Arrival (TDOA), Frequency Difference of Arrival (FDOA), or other similar associated techniques.

Support for such antenna array 412 and the determination of a direction of arrival may be included in communication access points that support multiple-input and multiple-output (MIMO) communications, such as later variants of WiFi (e.g., IEEE 802.1 in, IEEE 802.11ac), fourth-generation cellular telephony (e.g., Long Term Evolution (LTE) and LTE Advanced), WiMAX, Evolved High-Speed Packet Access (HSPA+) used with WCDMA (Wideband Code Division Multiple Access) UMTS (Universal Mobile Telecommunications System) third-generation generation cellular telephony, etc. Such MIMO devices may use the direction of arrival for beamforming, whereby the MIMO device calculates the point of origin of the received propagating waves to enhance the filtering of the received signals (e.g., spatial filtering) and to selectively focus transmitted signals at the point of origin (by controlling the phases of signals transmitted by the antenna array 412).

Figure 9:
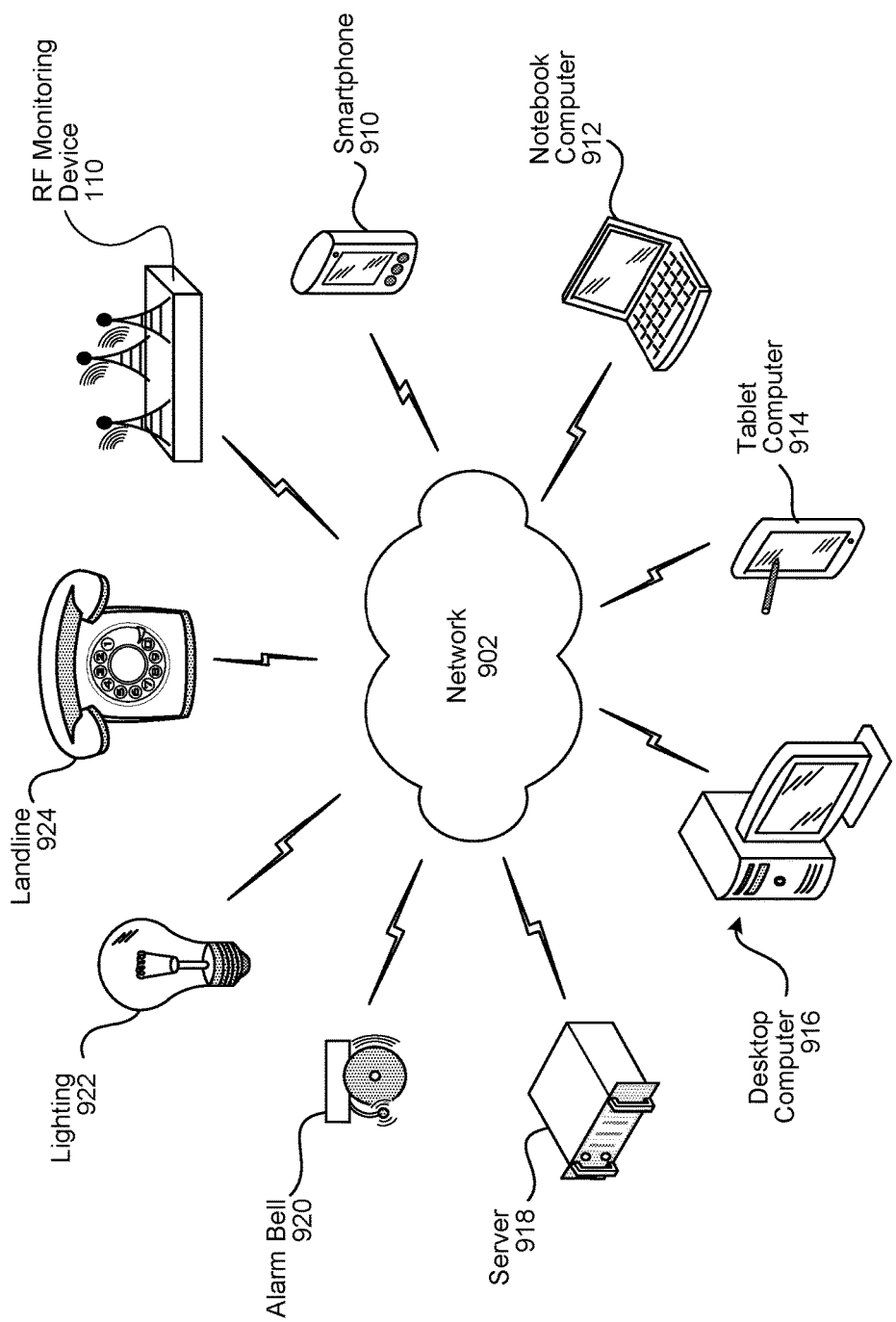
FIG. 9 illustrates an example of a network for use with the RF-based system for intrusion or attendance monitoring, time-stamping, and notification.

The system 400 may include one or more user interface (UI) devices 490, connected to the RF monitoring device 110 via a wired or wireless connection. The one or more UI devices 490 may also be connected to the device 110 via the network 902. A UI device may be any device configured to support user interaction with the RF monitoring device 110 to configure rules and settings, such as a smartphone 910, a notebook computer 912, a tablet computer 914, and a desktop computer 916, as illustrated in FIG. 9 (discussed further below). The RF monitoring device 110 may also directly support UI interface components, such as a monitor/display, a keyboard, etc.

The device 110 includes input/output device interfaces 402. A variety of components may be connected through the input/output device interfaces 402, such as the radio modem(s) 460 and the UI device 490, as well as any peripherals such as a monitor/display, a keyboard, etc. The input/output device interfaces 402 may also include interfaces for external connections such as universal serial bus (USB), FireWire, Thunderbolt or other connection protocol. In addition to communication connections via antenna array 412, the input/output device interfaces 402 may also include a connection to one or more networks 902 via a voice-grade telephone service connection, an Ethernet port, a wireless local area network (WLAN) (such as WiFi) radio, Bluetooth, and/or wireless network radio, such as a radio capable of communication with a wireless communication network such as a Long Term Evolution (LTE) network, a WiMAX network, a third-generation cellular telephony network, etc. Through the network 902, the system 100 may be distributed across a networked environment, as will be discussed further below with FIG. 9.

The device 410 may also include a global positioning module 468. This module provides an interface with geographic positioning system(s) such as the United States' Global Positioning System (GPS) and Russia's Global Navigation Satellite System (GLONASS). The global positioning module 468 may also acquire location-based information using other radio sources, such as mapping services that triangulate off of known service set identifiers (SSIDs) or using cellular towers. Although shown as integrated with the RF monitoring device 110, some or part of global positioning module 468 may be external to the RF monitoring device 110. For example, the global positioning module 468 may acquire location-based information from the user interface device 490.

The RF monitoring device 110 may include an address/data bus 424 for conveying data among components of the RF monitoring device 110. Each component within the RF monitoring device 110 may also be directly connected to other components in addition to (or instead of) being connected to other components across the bus 424.

The RF monitoring device 110 may include one or more controllers/processors 404, that may each include a central processing unit (CPU) for processing data and computer-readable instructions, and a memory 406 for storing data and instructions. The memory 406 may include volatile random access memory (RAM), non-volatile read only memory (ROM), non-volatile magnetoresistive (MRAM) and/or other types of memory. The device 110 may also include a data storage component 408, for storing data and controller/processor-executable instructions (e.g., instructions to perform the algorithms illustrated in FIGS. 5 and 6). The data storage component 408 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 402.

Computer instructions for operating the device 110 and its various components may be executed by the controller(s)/processor(s) 404, using the memory 406 as temporary "working" storage at runtime. The computer instructions may be stored in a non-transitory manner in non-volatile memory 406, storage 408, or an external device. Alternatively, some or all of the executable instructions may be embedded in hardware or firmware in addition to or instead of software.

The RF monitoring device 110 further includes a monitoring module 430 that performs the intrusion or attendance monitoring, time-stamping, and notification, either on its own or in concert with one or more software applications executed by the controller(s)/processor(s) 404. The monitoring module 430, as illustrated, includes components 431 to 444.

When an RF signal is received by a radio modem 460, the radio modem 460 may automatically extract unique identifier (UID) information from the received signals 106. In the alternative, or to supplement UID information extracted by the radio modem 460, the UID extraction engine 431 of the monitoring module 430 may extract UID information conveyed in the received signals 106. Also, if the RF monitoring device 110 engages in active probing, the queries sent to the detected device 104 via transmitter 462 are initiated and managed by the UID extraction engine 431.

The extracted UID information may be passed through a whitelist filter 432 to eliminate UIDs on a do-not-monitor list and a blacklist filter 440 that triggers immediate rule based actions in response to detecting particular UID (or unknown UID). The whitelist filter 432 and blacklist filter 440 access a UID whitelist and blacklist stored in non-volatile storage 438 containing UIDs that the owner of the RF monitoring device 110 has indicated should not be monitored (whitelist) or should be immediately acted upon (blacklist). For example, if a home digital media player or set-top box wirelessly connects to the Internet, it may be advantageous to place it on the whitelist. As another example, if someone has a restraining order against a former spouse, it may be advantageous to include that spouse's UID on the blacklist. Both the whitelist and blacklist filters are implemented as special rules executed by the rules engine 437 (discussed further below). The rules engine 437, either on its own or in conjunction with the pattern recognition engine (also discussed further below) may also add UIDs to the whitelist and the blacklist.

A UID lookup engine 433 may correlate a detected UID with other data available about the UID from one or more sources. For example, the UID lookup engine 433 may check a database stored in storage 438 to determine whether the UID has been "labelled" by the owner of the device 110, such as indicating a UID is associated with a family member, a friend, the plumber, a lawn service, etc. If the UID has not been "labelled," it may be tagged as "unknown." To the extent that labels are shared among devices 110 that are interconnected via a mesh 320 or network 902, the UID lookup engine 433 may also determine whether a UID is known to other interconnected devices 110 based on previously shared information stored in the database in storage 438, or by actively querying one or more of the other interconnected devices 110 for additional information about the UID.

The UID lookup engine 433 may also query external databases based on the extracted UID information. For example, a database may be queried for information about a cellular telephone subscriber based on an extracted UID. Also, ranges of MAC addresses and cellular telephony identifiers are often associated with particular device manufacturers and service providers, such that additional secondary information may be determined.

A location approximation engine 434 approximates a relative or actual location of the RF signals 106. If the radio modem(s) 460 provide direction of arrival (DOA) information, the location approximation engine may supplement this data, such as correlating direction over time to calculate a more accurate location "fix" than direction of arrival does on its own. If the radio modem(s) do not support DOA calculation, the location approximation engine 434 may calculate a location on its own based on signal strength and available data.

Among other things, the location approximation engine 434 may use a measurement of the received RF signal 106, such as a received signal strength (RSSI) measurement (a generic radio receiver technology metric) or a received power indicator (RCPI) measurement (a measure of the received RF power used with WiFi), to approximate the distance between the detected RF transmitter 104 and the monitoring device 110. The distance may be a rough approximation, or may be based on a "calibration" routine performed by the owner when initially installing the device 110. For example, the owner may enable global positioning data on a wireless UI device 490 and then connect to the monitoring device 110 from various positions relative to the device 110, so that the location approximation engine may correlate changes in received signal strength with actual physical locations. With only one antenna 112 and no mesh, this approximation of distance may be inexact. However, if there is more than one antenna 112, then differences in received power and/or signal phase between the antennae may be used to more accurately calculate distance. Other ranging and locating techniques may also be used.

Referring back to FIG. 3, even if each monitoring device 110 uses only one active antenna, or has multiple antennas but is unable to accurately determine direction, shared information between multiple interconnected or networked monitoring devices 110 may be used to better pinpoint the location of a detected RF transmitter 104, with the location approximation engine 434 of one or more of the RF monitoring devices 110 performing triangulation, trilateration and/or multilateration calculations using information such as signal strength, direction, and time-of-receipt information shared among the interconnected/networked devices 110. These devices 110 may automatically share this detected RF signal 106 strength and location information, or the location approximation engine 434 may send out a query to the other RF monitoring devices to request the shared data.

If the interconnected/networked devices 110 are using shared information to determine location, calibration procedures may be used to determine the locations of the different interconnected/networked devices 110. This may be based on, among other things, each device 110 determining its position using the global positioning module 468 or having an owner take various positions within the mesh with positioning services enabled on a wireless user interface device 490. In addition, during "formation" and synchronization (e.g., timing synchronization) of the cluster of devices (e.g., when the devices 110a to 110d initially interconnect), a "token" may be passed around, where the device 110 having the token broadcasts from its antennae 112, while the other nodes listen and measure signal strength, direction of arrival, etc.

If the geographic coordinates of the RF monitoring device 110 are known (e.g., as determined by global positioning module 468 or during calibration), and a location of the active RF transmitter 104 relative to the monitoring device 110 is determined (e.g., angle/direction and distance), then the location approximation engine 434 may approximate the actual position of the RF transmitter 104 (i.e., approximate the transmitter's geographic coordinates, such as latitude, longitude, and elevation).

The extracted UID information, UID lookup information, and location approximation are stored in storage 438 by event logger 435, together with a timestamp. Detections by the blacklist filter 431 may also be logged. Raw data such as signal strength (e.g., RSSI, RCPI), radio frequency channel, and radio access technology (e.g., Bluetooth, WiFi, LTE, etc.) may also be logged. The current data may also be provided to a pattern recognition engine 436, a rules engine 437, and a network coordination engine 439. The pattern recognition engine 436 and rules engine 437 may also access past data recorded in the stored log.

The pattern recognition engine 436 applies a set of dynamic models (e.g., Bayesian models) and filters to calculate probabilities and identify patterns in the data. The pattern recognition engine 436 may also use a heuristic database to build a profile of normal patterns associated with a particular UID (e.g., when a UID is ordinarily present, not present, what other UID are ordinarily also present, etc.). When patterns in the data are identified by the pattern recognition engine 436, one or more inferences or rules is added to the sets processed by the rules engine 437, as will be discussed further below. The pattern recognition engine 436 may also prompt a monitoring device 110 administrator via user interface device 490 to inform the user that a specific pattern has been identified, and inquire if the user wants to set a rule based on the pattern.

Because pattern recognition may involve significant computational resources, in terms of both storage and processing power, pattern recognition engine 436 may be located on a separate device, such as a server 918 connected to device 110 via network 902. Such split configurations may be advantageously employed where the device that performs signal acquisition has lower processing capabilities than a remote device.

The rules engine 437 may be, among other things, an inference engine that chains through stored rules and inferences to determine whether the extracted UID information triggers a rule-based action such as a notification. As noted above, the whitelist filter 432 and blacklist filter 440 may be "special" rules implemented by the rules engine 437.

When a rule does trigger action, the action is implemented by the execution engine 444. If a rule is satisfied that specifies an action or sequence of actions, and the action(s) include variables, the rules engine 437 may provide the execution engine 444 the specified variables together with the action. For example, if a rule "template" action associated with a rule specifies to send an e-mail notification to "X" saying that "Y" has arrived, the rules engine 437 may also specify that X is name@email.org and "Y" is a child's name associated with the detected UID as determined by UID lookup engine 433. The rules engine 437 may also provide a complete action instruction to the execution engine 444 with no variables, either by plugging in the variables prior to sending in the instruction to the execution engine 444 or because the action associated with the rule is a complete instruction (e.g., turn on the lights). The rules engine 437 or the execution engine 444 may also log when a rule is triggered and/or what actions were taken.

A rule may trigger multiple actions, and the detection of a single UID may trigger multiple rules. An action may also trigger another rule (e.g., if a rule turns on the lights, then send an e-mail notification).

Network coordination engine 439 serves as a network node interface, sharing data with other nodes of the cluster, mesh, etc., of the interconnected/networked devices 110. The network coordination engine 439 may include a privacy filter, whereby certain information is not shared in accordance with administrative setting stored in storage 438. For example, when an owner of a monitoring device 110 adds a "label" identifying a UID (e.g., family member, plumber, delivery man, etc.), that information may be selectively shared with other nodes in accordance with the privacy filter, identifying some individuals, classes, and groups but not others.

Also, depending on the label, other the interconnected/networked devices may respond with information when the label is shared. For example, if someone tags a UID as "stranger," this tag may elicit a response from another device 110 whose owner has tagged the UID with an identifying label. The UID lookup engine 433 may give priority to labels defined by its own device's administrator versus those received from other devices 110, but may present conflicting labels to the device's owner or administrator via UI device 490 for resolution. As another example, if someone tags a UID as "prowler" and an interconnected/networked device detects the UID, the interconnected/networked devices may enter an "alert" mode, suspending or reducing potentially interfering transmissions from transmitter 462, boosting a sensitivity of receiver 464, and increasing a frequency of data sharing in an effort to more accurately track the RF transmitter 104. Different alert "priority" levels may be individually or jointly specified.

Scheduler 442 implements "alarms" that cause the rules engine 437 to determine if one or more rules is satisfied at preset times. Alarms enable the rules engine 437 to test for the presence or absence of a specific UID at a certain time without the occurrence of a UID detection "event" activating the rules engine 437. Also, alarms may be used to trigger rules to check for the presence or absence of UID that are ordinarily ignored due to the whitelist filter 432.

Storage 438 may be one or more non-volatile storage types as was discussed with data storage component 408, and/or may be part of data storage component 408. In addition to the various extracted information and engine-related data stored in storage 438, some or all of the processor-executable instructions for the various components and engines of monitoring module 430 may also be stored in storage 438.

FIG. 5A illustrates different aspects of an example algorithm that may be used by the RF monitoring device 110. The transmitter 462 monitors (502) for RF signals. This may include, for example, scanning across multiple frequency bands for a signal 106. If a signal is detected (504 "Yes"), a radio modem 460 and/or the UID extraction engine 431 extracts (510) UID information. If the extracted UID is not listed on the whitelist (512 "No") in storage 438, the whitelist filter 432 of rules engine 437 may pass the UID information to the blacklist filter 440 of the rules engine 437. In practice, the whitelist and blacklist may be a single list, with the various listed UIDs associated with special rules that dictate how and when to act immediately on extracted UID. If the extracted UID is on the blacklist (514 "Yes"), the associated action(s) of the special rule may be applied (536) by the execution engine 444. Otherwise (514 "No"), the extracted UID may be sent to the UID lookup engine 434 for lookup (520) of additional information. The location approximation engine 434 may also approximate (522) the distance and/or location of the received signal's point-of-origin, and the various data for the "event" is logged in storage 438 by event logger 435.

Based on the event, the rules engine 437 chains through rules, inferences, and labels to determine whether the event satisfies a rule (532). If a rule is satisfied (532 "Yes") and the rule has not already been applied (534 "No") during this occurrence of the UID, then the rule is applied 536. For example if a notification was sent when a UID was first detected, checking (534) to see if the particular rule has already been applied for this occurrence avoid generating duplicate notifications. When a rule is applied, it may also be logged (540).

If no rule is satisfied (532 "No"), if the rule was already applied (534 "Yes"), and after a rule is applied (536), the monitoring module 430 checks to see if the active RF transmitter 104 is still present (544). If it is (544 "Yes"), the module loops back to approximating the originating location (522) of the transmitter 104, repeating the process of logging the event (530), etc. When the signal 106 is no longer present (544 "No"), the process loops back to monitoring for RF signals (502).

The approximate departure time of a UID may be determined based on when a series of detections in the log end. In the alternative, when a detected UID is no longer detected (544 "No"), the failure to detect may be logged as a departure. This departure-logging may be combined with logging only when a detected UID changes location to create a more compact log than might be produced by periodic logging, while at the same time being more informative than only logging initial detections of a UID.

When an active RF transmitter 104 loiters near the RF monitoring device 110, the event logger may selectively log information. For example, the event logger may only log when the RF transmitter 104 changes position, may log only when the transmitter 104 changes position by a certain amount, may log every so many seconds, etc. What and when the event logger stores may be an administrative setting, configured by the monitoring device's owner or otherwise.

Figure 5B:
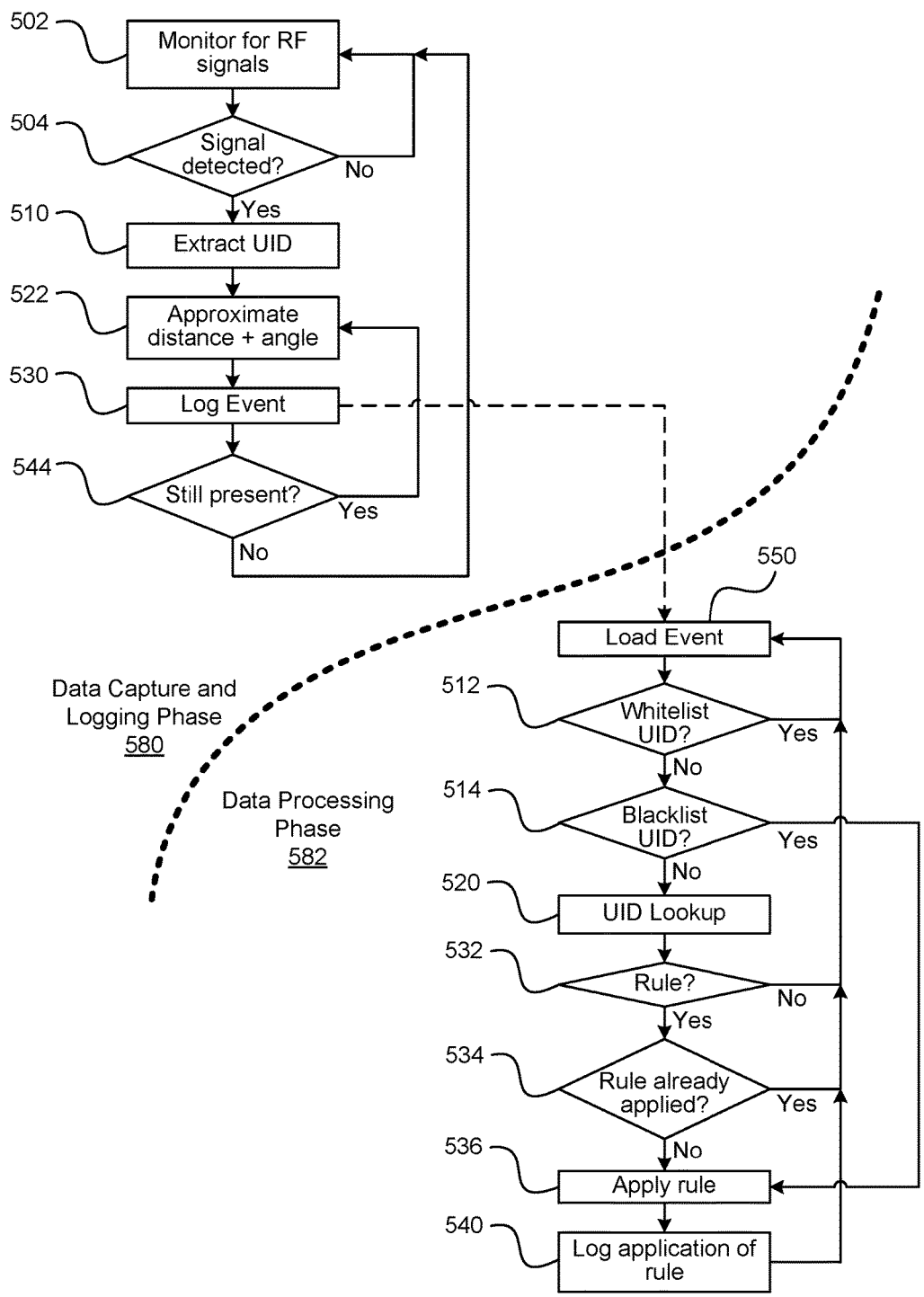

FIG. 5B is an example of another algorithm that is similar to that in FIG. 5A, but where the steps are reordered to provide a data capture and logging phase 580, and a data processing phase 582. During the UID acquisition and data capture and logging phase 580, the RF monitoring device 110 monitors for RF signals (502), checks to see if a signal is detected (504), extracts (510) UID information from the detected signal, approximates distance and angle (522), and logs the detection event (544). Examples of how the logging of a UID's continued detection (544 "Yes") or non-detection may be handled is the same as was discussed with FIG. 5A.

In the data processing phase 582, an event is loaded (550) from the stored log. The whitelist (512) and blacklist (514), a UID lookup may be performed (520), and rules are checked and applied (532, 534, 536). A log entry may be made (540) if a rule is applied and/or an action is taken, either in the same log used to log events (i.e., the log from 530), in a copy of the log stored wherever the processing phase is taking place, in a separate log of rules/actions stored wherever the processing phase is taking place, or a combination thereof. Likewise, log entries may be made for blacklist detection events (514 "Yes"), UID lookup (520) information, etc.

During the data capture and logging phase 580, approximating distance and angle (522) may be a complete approximation, or may be a partial and/or unprocessed information such as signal strength information (e.g., RSSI or RCPI) and/or direction of arrival (DoA) information (such as DoA information provided by the direction of arrival engine 466 of the receiver 464) that is logged (530) with the extracted UID. If partial and/or unprocessed location information is stored in the log, a more detailed calculation may be performed in the data processing phase 582 to provide a more complete approximation. For example, during the data processing phase 582, logged signal strength information may be converted into an estimation of distance. Also during the data processing phase 582, location determination and refinement may be undertaken by the location approximation engine 434 by combining the partial location information with location-related data from other monitoring devices 110, such as combining location data that was recorded by multiple devices 110 of a same UID at approximately the same time based upon log time stamps.

The data capture and logging phase 580 and the data processing phase 582 may be performed at approximately the same time, or the data processing phase 582 may be performed at a later data. For example, in some contexts where an RF monitoring device 110 might be deployed, notifications may simply be informative rather than warnings or alerts, such that contemporaneous data processing is not important.

A bifurcated arrangement such as that illustrated in FIG. 5B may have advantages, for example, if UID acquisition and processing are done on different devices such as in a distributed computing environment. With such an arrangement, the UID extraction engine 431 and the event logger 435 may be collocated with the antennae 112 and radio modem(s) 460, while the processing-related engines of monitoring module 430 may be remotely or separately located. For example, if the network of devices is arranged in a star topology with a server (e.g., 918 in FIG. 9) or central device collecting information, that device handling information collection may also be tasked with some or all of the data processing phase 582.

The execution engine 444 may be collocated with the UID extraction engine 431 to perform specified actions at the UID acquisition location, may be collocated with the processing-related engines of the monitoring module 430 remote/separate from the UID acquisition location, or a combination thereof.

This bifurcated arrangement may also have advantages if the RF monitoring device 110 is operating in a low power mode during the UID acquisition phase, such as if temporarily operating on batteries.

Figure 6:
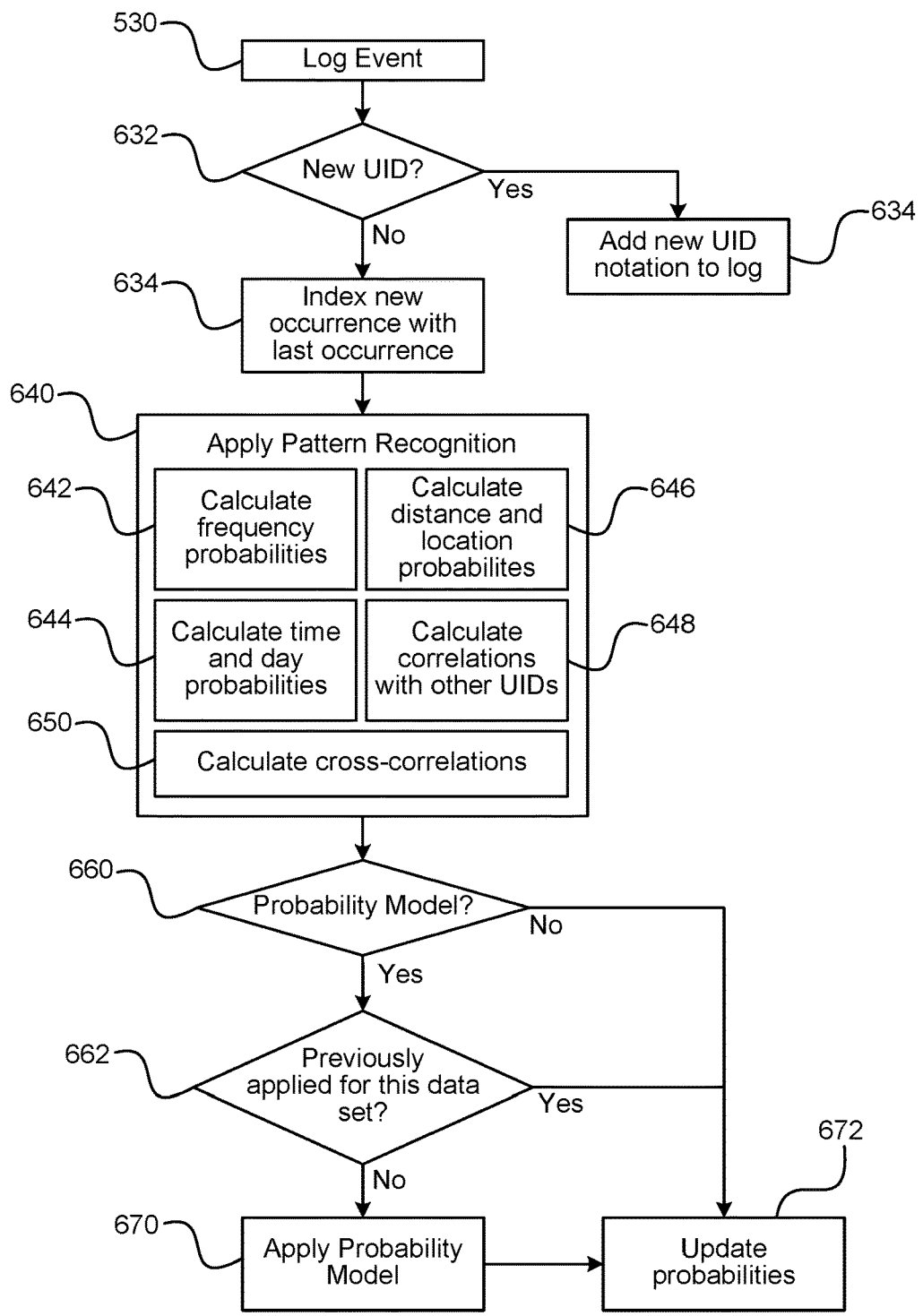
FIG. 6 is an example of an applied pattern recognition algorithm.

FIG. 6 illustrates an example of an algorithm that may be used by pattern recognition engine 436, which may be performed iteratively or in parallel with that in FIG. 5.

When a new UID is detected (632 "Yes"), the pattern recognition engine 436 may annotate the log to note that this is the first occurrence of the UID (634). Instead of or in addition to using the log, the pattern recognition engine 436 may have its own data store or database in storage 438, noting occurrence of the UID there.

If the UID has been detected before (632 "No"), the pattern recognition 436 indexes (634) the new occurrence to link or associate it to one or more past occurrences of the same UID, thereby facilitating machine learning based on the pattern of occurrences.

The pattern recognition engine 436 applies pattern recognition (640) models and filters to the present and past UID data. This may include, for example, calculating UID frequency-of-occurrence probabilities (642) based on how often the UID is detected, calculating time and day probabilities 644 based on when the UID has been detected, calculating distance and location probabilities (646) based on where the UID has been detected, calculating correlations with other UIDs (648) based on what other UIDs have been present when the extracted UID was present, and performing meta cross-correlations 650, calculating patterns between the patterns.

If the resulting data satisfies a probability model (660 "Yes"), and the probability model has not already been applied for this UID (662 "No"), then the pattern recognition engine 436 applies the probability model (670, explained further below) and updates (672) probability data stored in storage 438. Otherwise (660 "No" or 662 "Yes"), the probability data (672) is updated without applying a probability model.

The steps illustrated in FIGS. 5 and 6 may be executed in a different order or in parallel. In systems implementing the steps, one or more steps may also be omitted, and additional steps may be added.

Figure 7:
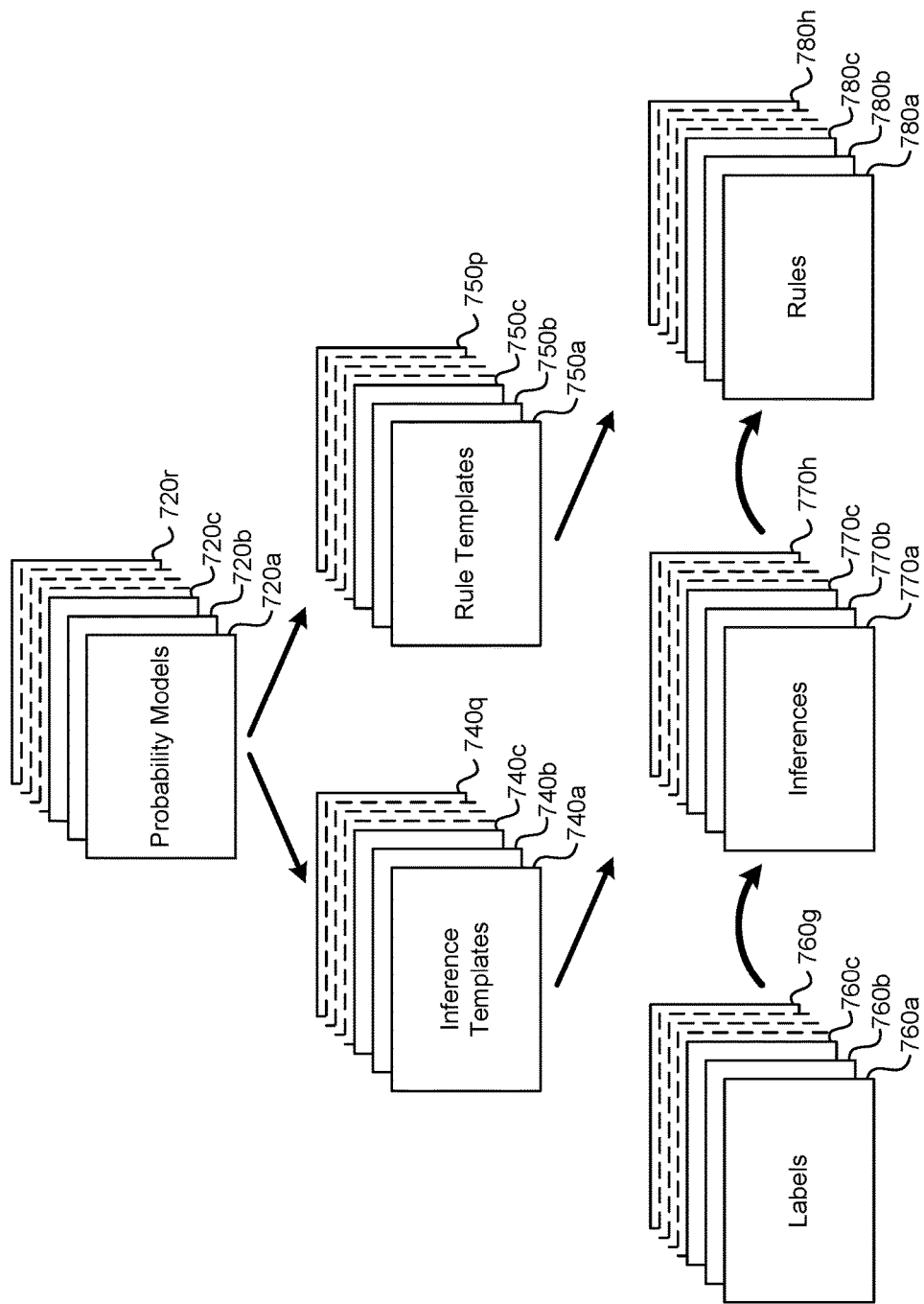
FIG. 7 illustrates relationships between probability models utilized by the example applied pattern recognition algorithm, and the rules applied by the RF-based system for intrusion or attendance monitoring, time-stamping, and notification.
Figure 8:
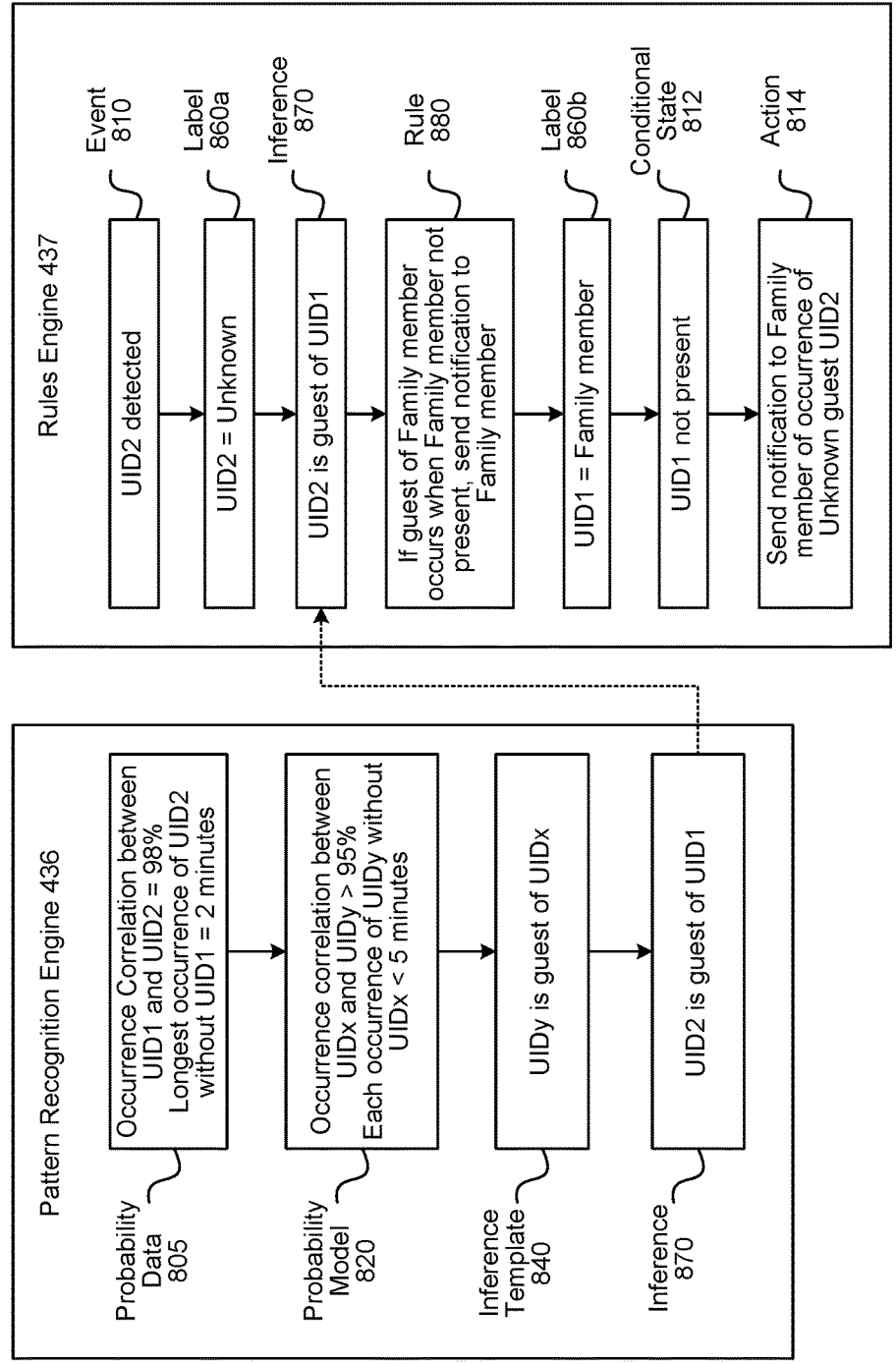
FIG. 8 demonstrates a specific example of how pattern recognition may lead to an actionable rule.

FIGS. 7 and 8 demonstrate an example of how a probability model may be satisfied (660 "Yes") and applied (670). After the pattern recognition engine 436 applies (640) a set of dynamic models (e.g., Bayesian models), filters, and heuristics to calculate probabilities and correlations, the resulting probability data and weights are compared with a set of probability models 720a to 720r. The probability models 720 include criteria based on probability data and weights, and are linked to one or more inference templates (740a to 740q) and/or rule templates (750a to 750p).

For example, in FIG. 8, a UID detection event results in a plurality of probability data, which includes (among other things) probability data 805 that an occurrence correlation between UID1 and UID2 is ninety-eight percent, and that the longest occurrence of UID2 without UID1 being present has been two minutes. There is a probability model 820 in the probability model set (720a to 720r) that is satisfied if an occurrence correlation between UIDx and UIDy exceeds ninety-five percent, if each occurrence of UIDy without UIDx is less than five minutes. The probability model 820 is linked to an inference template 840 in the inference template set (740a to 740q). The linked inference template 840 produces an inference that UIDy is a guest of UIDx.

When the pattern recognition engine 436 determines that the probability data 805 satisfies the probability model 820, the event-specific data is added to the fields of the inference template 840 to produce an inference 870 that UID2 is a guest of UID1. The inference 870 is then added to the set of inferences 770a to 770h in storage 438 that is used by the rules engine 437.

By assigning "weights" to rules the system may better adjust if the pattern recognition engine 436 incorrectly identified a rule set for a location (based on user feedback), or if the pattern recognition engine 436 correctly identified a rule set, but the user sometimes does something different. When a rule falls below a threshold, the pattern recognition engine may reevaluate the rule and original tags.

In addition, when a probability model 720 matches at least some of the pattern recognition data, a monitoring device 110 administrator may be prompted via the user interface device 490, reporting to the administrator that the pattern has been identified and to query what (if any) rules 780 and/or inferences 770 may be applied to the pattern in the future. This may be based on (among other things) certain pattern probabilities exceeding a specified threshold (e.g., if more than a 95% correlation over more than 10 separate UID detections, prompt the user for instructions) and/or if a probability model 820 is satisfied but additional data is needed to instantiate an inference 770 or rule 780 based the implicated inference template 740 or rule template 750 (e.g., if a value for a variable specified in the inference or rule template linked to the probability model is unknown, or if a variable specified in the inference/rule template is non-deterministic, where the probability model is satisfied, but the value for a variable is statistically inconsistent across UID event occurrences).

Probability data following a UID detection event may correspond to multiple probability models, and probability models may link to one or more of the inference templates and rule templates. Periodically or after a detection event, the pattern recognition engine 436 may check whether a previously satisfied probability model is no longer satisfied by the probability data, and extract associated inferences and rules from the sets used by the rules engine 436.

The rules engine 437 chains through the labels (760*a* to 760*g*), inference (770*a* to 770*h*) and rules (780*a* to 780*h*), with rules specifying one or more action to be taken if the rule is satisfied. For example, referring to FIG. 8, the triggering event 810 is detection of "UID2." The rules engine 437 checks the labels for the identify of UID2, finding that the UID lookup engine 434 has tagged UID2 as "unknown" (label 860*a*). In the inference set, the rules engine 437 finds the inference 870 generated by the pattern recognition engine 436 that UID2 is a guest of UID1. In the rule set, the rules engine 437 finds a rule 880 that if a guest of a family member is detected when the family member is not present, a notification should be sent to the family member. The rules engine 437 determines from label 860*b* that UID1 is a family member, and that the conditional state 812 that the family member is not present (i.e., that UID1 is not present) is satisfied. Therefore, since the rule 880 is satisfied, the rules engine 437 instructs the execution engine 444 to perform the rule-specified action 814: to send a notification to the family member associated with UID1 of the occurrence of unknown guest UID2. The action may be taken independently by the execution engine 444, or in coordination with software application instructions executed by controllers/processors 404.

The inference templates (740*a* to 740*q*) and rule templates (750*a* to 750*p*) may also include templates that can be configured by a monitoring device 110 administrator via user interface device 490. Rule templates may also generate inferences and labels in addition to rules, and inference templates may generate labels in addition to inferences. In addition, the criteria and thresholds in probability models, as well as the model's association with an inference or rule template, may also be configured by the device administrator.

The alarms acted upon by the scheduler 442 may also be added by the device administrator, based on a pattern, or as an action specified by a rule, generating non-detection events that trigger the rules engine 437 to check for certain conditional states at preset times, such as checking to see whether a specific UID is present at a certain time (e.g., at four in the afternoon, check to see if a child's UID is detected indicating they are home from school) or to check presence or absence based on a past pattern of occurrence (e.g., administrative settings associated with a probability model that if a pattern of detection indicates better than a ninety-five percent correlation that a certain UID will be detected on a certain time and day, generate an alarm to check for that UID at the expected times and add a rule that if the UID is not detected more than two times in-a-row when it was expected, send a notification). Alarms may be used for a wide variety of "omissions" detection and reporting, where the alarm serves as a non-detection event that triggers the rules engine 437. When an alarm invokes the processing of a rule by the rules engine 437, the whitelist may be ignored, such that a whitelist UID may be specified by the alarm.

Although statistical, Bayesian probability-based machine learning techniques provide the underpinnings for the examples, the pattern recognition engine 436 may use other pattern recognition techniques, either instead of or in conjunction with probability-based machine learning. For example, a Kalman filter or regression analysis combined with heuristics may be used to determine whether a detection event does not conform to expected patterns, or to determine whether an expected detection event has not occurred.

As noted above, the RF monitoring device 110 may be implemented as a dedicated device, or may comprise features included or added to existing devices such as wireless computing devices and routers. The monitoring module 430 may be implemented in a distributed environment, with one or more components located remote from the RF monitoring device 110, such as implementing the pattern recognition engine 436 on a remote server 918. In addition, actions specified by rules may include sending commands to other devices distributed across the network 902.

For example, as illustrated in FIG. 9, multiple devices (910-924) connected via network 902 may contain components of the system 100/400, or may be acted upon in accordance with one or more of the rules (780*a* to 780*h*). Network 902 may include a local or private network or may include a wide network such as the internet. Devices may be connected to the network 902 through either wired or wireless connections. For example, a smartphone 910, a notebook computer 912, and a tablet computer 914 may be connected to the network 902 through a wireless service provider, over a WiFi or cellular network connection or the like. Each of these devices may serve in the role of an RF monitoring device (i.e., as an implementation of RF monitoring device 110), as a user interface device 490, as the detected RF transmitter 104, as the recipient of a rule-based action (e.g., a text message notification), or as a subset or combination thereof. Other devices, such as a desktop computer 916, server 918, and landline telephone 924 may connect to the network 902 through a wired connection.

The network 902 may include a "network of things," such as an alarm bell 920 and lighting 922, with an action generated by a rule triggering or otherwise controlling one or more of the network of things.

Depending on topology, a monitoring device 110 that is connected to other monitoring devices 110 by direct device-to-device contact but not to the network 902 may be able to access the network 902 indirectly via another monitoring device (e.g., sending out UID queries from UID lookup engine 433 via the network 902, even though the monitoring device issuing the query is not itself connected to the network 902). Also, in a directly interconnected and/or networked configuration, monitoring devices 110 may be both fixed and mobile. For example, some monitoring devices 110 may be stationary routers as shown in FIG. 3, whereas other monitoring devices 110 may be mobile devices.

Different interconnected/networked monitoring devices 110 may have differing capabilities, such as certain monitoring devices being able to monitor frequency bands and communications protocols that other linked monitoring devices are not capable of monitoring. Even if a linked monitoring device is not capable of independently monitoring a particular RF transmitter 104, it may make use of information shared by a monitoring device that is capable. For example, if a UID is detected by a monitoring device, and that or another monitoring device tags the UID with a "label," a detection event associated with that label may be meaningful to a monitoring device that is otherwise incapable of detecting the UID itself.

Multiple devices 110 may be employed in a single RF monitoring system. In such a multi-device system, each of the monitoring devices 110 may include different components for performing different aspects of the RF-based system for intrusion or attendance monitoring, time-stamping, and notification process. The multiple devices may include overlapping components. The components of RF monitoring device 110 as illustrated in FIG. 4 is exemplary, and may be a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of monitoring module 430 may be implemented as firmware or as a state machine in hardware. For example, the location approximation engine 434, the event logger 435, and the network coordination engine 439 may be implemented as one or more application specific integrated circuits (ASICs).

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   determining a first identifier corresponding to a first radio frequency (RF) signal received during a first time period and within a first location, wherein the first identifier is associated with a first device that sent the first RF signal;
   determining the first identifier is not associated with the first location and the first time period;
   identifying at least one first criterion to perform a first action, the first criterion being satisfied based at least in part on the first identifier not being associated with the first location and the first time period;
   performing the first action, the first action comprising storing first data associating at least one of the first identifier or first device with the first location;
   determining a second identifier corresponding to a second RF signal received during the first time period and within the first location, wherein the second identifier is associated with a second device that sent the second RF signal;
   determining the second identifier is not associated with the first location and the first time period;
   identifying at least one second criterion to perform a second action, the at least one second criterion being satisfied based at least in part on the second identifier not being associated with the first device and the first time period; and
   performing the second action, the second action comprising storing second data associating at least one of the first identifier or first device with at least one of the second identifier or second device.

2. The method of claim 1, further comprising:
   determining a first signal strength associated with the first RF signal; and
   estimating a position of the first device using the first signal strength.

3. The method of claim 1, further comprising:
   detecting the first identifier corresponding to a third RF signal received during a second time period and within a second location; and
   estimating a direction of travel of the first device using the first location, the second location, the first time period, and the second time period.

4. The method of claim 1, further comprising:
   storing an association between the second identifier, the first identifier and the first time period;
   determining an estimated time when the first device is predicted to move to a different location from the second device; and
   indicating the association should be deleted after the estimated time.

5. The method of claim 1, further comprising:
   storing an association between the second identifier, the first identifier and the first location;
   determining an estimated time when the first device is predicted to depart the first location; and
   indicating the association should be deleted after the estimated time.

6. The method of claim 1, wherein the first RF signal and second RF signal are detected by a third device within the first location.

7. The method of claim 1, further comprising:
   identifying at least one third criterion to perform a third action, the third criterion being satisfied based at least in part on the first device and second device being within the first location together during the first time period; and
   performing the third action, the third action comprising creating a notification.

8. A computing system, comprising:
   at least one processor; and
   at least one memory including instructions that, when executed by the at least one processor, cause the computing system to:
   determine a first identifier corresponding to a first radio frequency (RF) signal received during a first time period and within a first location, wherein the first identifier is associated with a first device that sent the first RF signal;

determine the first identifier is not associated with the first location and the first time period;

identify at least one first criterion to perform a first action, the first criterion being satisfied based at least in part on the first identifier not being associated with the first location and the first time period;

perform the first action, the first action comprising storing first data associating at least one of the first identifier or first device with the first location;

determine a second identifier corresponding to a second RF signal received during the first time period and within the first location, wherein the second identifier is associated with a second device that sent the second RF signal;

determine the second identifier is not associated with the first location and the first time period;

identify at least one second criterion to perform a second action, the at least one second criterion being satisfied based at least in part on the second identifier not being associated with the first device and the first time period; and perform the second action, the second action comprising storing second data associating at least one of the first identifier or first device with at least one of the second identifier or second device.

9. The computing system of claim 8, wherein the instructions, when executed, further cause the computing system to:

determine a first signal strength associated with the first RF signal; and estimate a position of the first device using the first signal strength.

10. The computing system of claim 8, wherein the instructions, when executed, further cause the computing system to:

determine the first identifier corresponding to a third RF signal received during a second time period and within a second location; and estimate a direction of travel of the first device using the first location, the second location, the first time period, and the second time period.

11. The computing system of claim 8, wherein the instructions, when executed, further cause the computing system to:

store an association between the second identifier, the first identifier and the first time period;

determine an estimated time when the first device is predicted to move to a different location from the second device; and indicate the association should be deleted after the estimated time.

12. The computing system of claim 8, wherein the instructions, when executed, further cause the computing system to:

store an association between the second identifier, the first identifier and the first location;

determine an estimated time when the first device is predicted to depart the first location; and indicate the association should be deleted after the estimated time.

13. The computing system of claim 8, wherein the first RF signal and second RF signal are detected by a third device within the first location.

14. The computing system of claim 8, wherein the instructions, when executed, further cause the computing system to:

identify at least one third criterion to perform a third action, the third criterion being satisfied based at least in part on the first device and second device being within the first location together during the first time period; and perform the third action, the third action comprising creating a notification.

15. A non-transitory computer readable medium having stored thereon instructions to configure at least one computing system to:

determine a first identifier corresponding to a first radio frequency (RF) signal received during a first time period and within a first location, wherein the first identifier is associated with a first device that sent the first RF signal;

determine the first identifier is not associated with the first location and the first time period;

identify at least one first criterion to perform a first action, the first criterion being satisfied based at least in part on the first identifier not being associated with the first location and the first time period;

perform the first action, the first action comprising storing first data associating at least one of the first identifier or first device with the first location;

determine a second identifier corresponding to a second RF signal received during the first time period and within the first location, wherein the second identifier is associated with a second device that sent the second RF signal;

determine the second identifier is not associated with the first location and the first time period;

identify at least one second criterion to perform a second action, the at least one second criterion being satisfied based at least in part on the second identifier not being associated with the first device and the first time period; and perform the second action, the second action comprising storing second data associating at least one of the first identifier or first device with at least one of the second identifier or second device.

16. The non-transitory computer readable medium according to claim 15, further configuring the computing device to:

determine the first identifier corresponding to a third RF signal received during a second time period and within a second location; and estimate a direction of travel of the first device using the first location, the second location, the first time period, and the second time period.

17. The non-transitory computer readable medium according to claim 15, further configuring the computing device to:

store an association between the second identifier, the first identifier and the first time period;

determine an estimated time when the first device is predicted to move to a different location from the second device; and indicate the association should be deleted after the estimated time.

18. The non-transitory computer readable medium according to claim 15, further configuring the computing device to:

store an association between the second identifier, the first identifier and the first location;

determine an estimated time when the first device is predicted to depart the first location; and indicate the association should be deleted after the estimated time.

19. The non-transitory computer readable medium according to claim 15, wherein the first RF signal and second RF signal are detected by a third device within the first location.

20. The non-transitory computer readable medium according to claim 15, further configuring the computing device to:
- identify at least one third criterion to perform a third action, the third criterion being satisfied based at least in part on the first device and second device being within the first location together during the first time period; and
- perform the third action, the third action comprising creating a notification.

* * * * *